March 5, 1935.　　A. S. KASDAN　　1,993,144
FLY BOX
Filed March 31, 1934
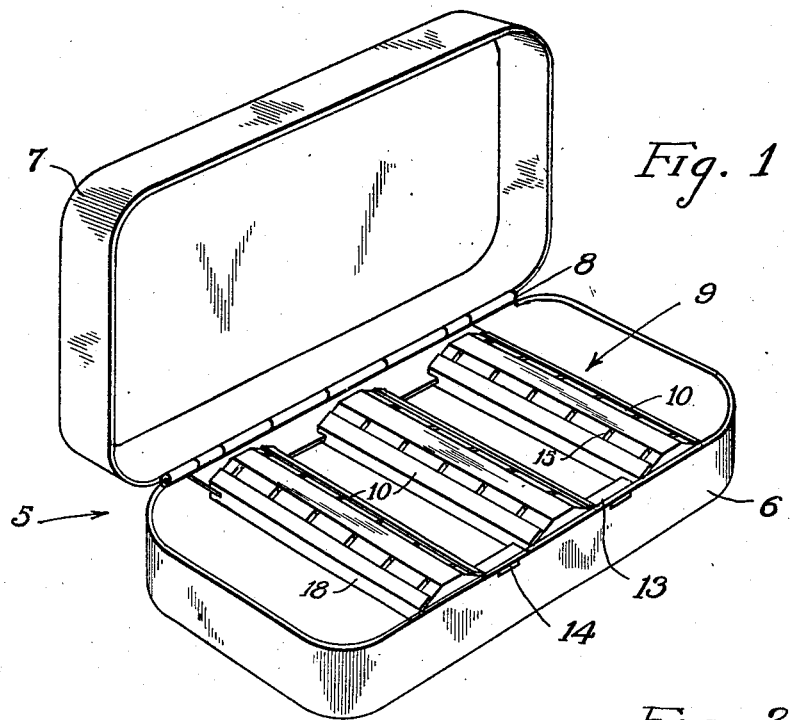
*Fig. 1*
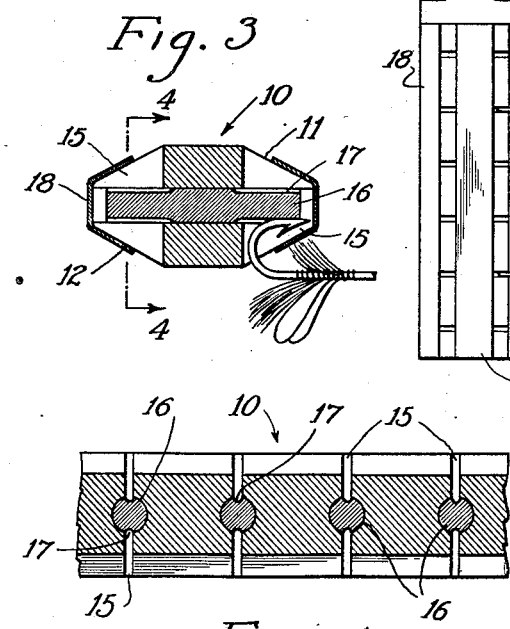
*Fig. 3*
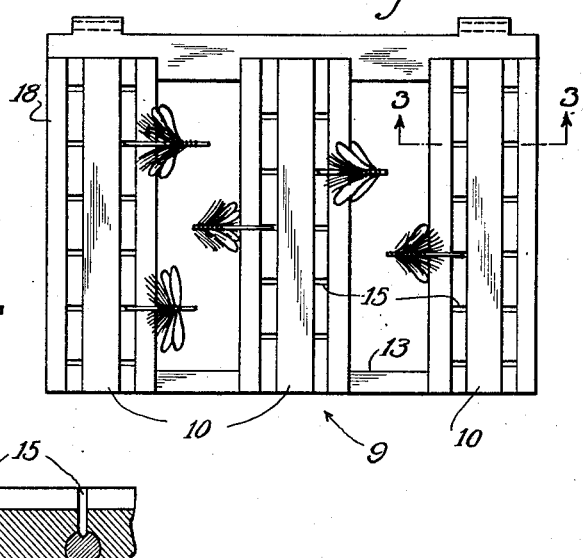
*Fig. 2*
*Fig. 4*
Alfred S. Kasdan
INVENTOR
BY Victor J. Evans & Co.
ATTORNEY
WITNESS:

Patented Mar. 5, 1935

1,993,144

UNITED STATES PATENT OFFICE 1,993,144

FLY BOX

Alfred S. Kasdan, New York, N. Y.

Application March 31, 1934, Serial No. 718,487

6 Claims. (Cl. 43—32)

This invention relates to fly boxes and such containers designed to hold fly hooks and other fishing tackle.

In the sport of fly fishing a form of hook is used having feathers and other similar material attached, the appearance of which simulates flies and other insects. In fresh water fishing these flies at the end of a fishing line are guided along the surface of the water and the fish are attracted thereto. This type of fishing tackle is rather delicate of structure and therefore requires a container for its protection which will support the fly hook so that none of the delicate feathers contact with any other surface.

It is the object of my invention to provide a simple and convenient means for holding these flies in such manner that they may be readily placed or removed from their support and in such manner that their shape will not be deformed in any manner.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

Fig. 1 is a perspective view of the fly box in open position preparatory to placing flies therein.

Fig. 2 is a plan view of the fly rack.

Fig. 3 is a lateral sectional view taken on line 3—3 of Fig. 2; and

Fig. 4 is a longitudinal sectional view taken on line 4—4 of Fig. 3.

Referring to the drawing for a more detailed description thereof, numeral 5 indicates a fly box comprising a lower section 6 and an upper section 7 hinged together at 8. Numeral 9 indicates a fly supporting rack, the distal end of which is pivoted on the hinge 8 so that the box 5 may be opened from either side. The rack 9 comprises a plurality of spaced parallel cross members 10. These cross members 10 are substantially symmetrical in cross-section, as shown in Fig. 3, and have their upper and lower surfaces chamfered at each edge, indicated by numerals 11 and 12, respectively. The cross members 10 have their proximal ends secured to a longitudinal cleat 13 having lugs 14 formed thereon and adapted to engage the front edge of either portion of the box 5 so that the rack 9 is retained in spaced relation to the top or bottom of the box. The distal ends of the cross members 10 are attached to a second longitudinal cleat, the rear edge of which has formed on it a number of loops which fit over a portion of the pin of the hinge 8. This form of attachment makes readily accessible the flies which are supported on either side of the rack 9.

In each cross member 10 is cut a series of spaced slots 15 of a width sufficient to permit the convenient insertion of a fishing fly hook and retain same in approximate vertical position. The slots in adjacent cross members are disposed in staggered relation to each other to allow the placement of a maximum number of flies on each surface of the rack 9.

Numeral 16 indicates a plurality of magnets which have previously been permanently magnetized. These magnets are interposed between the upper and lower surfaces of cross members 10 substantially at right angles to their longitudinal edge and in approximate alignment with the slots 15. Each magnet has cut on a portion of its periphery adjacent the slot 15 a semi-circular groove 17. It will be noted that these magnets have their ends spaced from the edge of the cross members 10. The grooves 17 are provided to increase the surface of contact with the hook of the fly and thus insure maximum attraction between these two members. The space between the end of the magnet and the edge of the cleat 10 is provided so that the magnet contacts only with the heavier portion of the hook. Attached to the longitudinal edges of the cross members 10 are channel members 18 which, in conjunction with the slots 15, form a recess to protect and retain the barb of a fly hook should the hook tend to become dislodged by a sudden shock imparted to the fly box.

It will be readily observed from an inspection of the drawing that my invention provides a conveniently accessible arrangement for the storage and protection of fishing flies.

What is claimed is:

1. In a fly box, a rack including a magnet, said rack having a slot to receive an end portion of a fishing fly and to allow the latter to contact the magnet.

2. In a fly box, a rack including a magnet, said rack having a slot to receive an end portion of a fishing fly and to allow the latter to contact the magnet, said magnet having a groove into which an end portion of the fishing fly may be inserted.

3. In a fly box, a rack including a magnet, said rack having a plurality of slots to receive end portions of fishing flies and to allow the latter to contact the magnet, said magnet having grooves in alignment with the grooves of the rack and adapted to receive end portions of the flies.

4. A fly box comprising a container, a plurality of racks hingedly connected to and disposed within said container, each of said racks including a magnet, said racks each having slots to receive end portions of fishing flies and to allow the latter to contact the magnet.

5. A fly box comprising a container, a plurality of racks hingedly connected to and disposed within said container, each of said racks including a magnet, said racks each having slots to receive end portions of fishing flies and to allow the latter to contact the magnet, said magnets each having slots adapted to receive end portions of the flies.

6. In a fly box, a rack including a magnet, said rack having a slot to receive an end portion of a fishing fly and to allow the latter to contact the magnet, said rack being formed to provide means for retaining the fishing fly therein in the event that the fly is jarred loose from the magnet.

ALFRED S. KASDAN.